US008862645B1

(12) United States Patent
Ma et al.

(10) Patent No.: US 8,862,645 B1
(45) Date of Patent: Oct. 14, 2014

(54) MULTI-PATH FILE SYSTEM WITH BLOCK CACHE BETWEEN CLIENT AND STORAGE ARRAY

(71) Applicant: EMC Corporation, Hopkinton, MA (US)

(72) Inventors: Gang Ma, West Roxbury, MA (US); Sorin Faibish, Newton, MA (US); Dominique Cote, Cambridge, MA (US); James M. Pedone, Jr., West Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 142 days.

(21) Appl. No.: 13/629,794

(22) Filed: Sep. 28, 2012

(51) Int. Cl.
*G06F 17/30* (2006.01)

(52) U.S. Cl.
USPC .......................................................... 707/827

(58) Field of Classification Search
CPC .................................................. G06F 17/30132
USPC .............. 707/2, 3, 827; 710/19; 711/119, 173
See application file for complete search history.

(56) References Cited

U.S. PATENT DOCUMENTS

| 7,418,465 | B1 * | 8/2008 | Lewis et al. ........................... 1/1 |
| 7,856,530 | B1 * | 12/2010 | Mu ................................ 711/119 |
| 2005/0289252 | A1 * | 12/2005 | Kim et al. ........................ 710/19 |
| 2006/0236068 | A1 * | 10/2006 | Li et al. .......................... 711/173 |

OTHER PUBLICATIONS

EMC Corporation, "Server Flash Cache for Superior Performance, Intelligence, and Protection of Mission-Critical Data," May 2012, 3 pages.
EMC Corporation, "Meeting the Needs of the Most-Demanding Applications with the World's Best NAS Performance," EMC Celerra Multi-Path File System (MPFS), Nov. 2009, 4 pages.
EMC Corporation, "Using VNX Multi-Path File System, P/N 300-013-460 Rev. 01," EMC VNX Series, Release 7.1, Jul. 2012, 64 pages.
EMC Corporation, "Introduction to EMC VFCache," White Paper, Feb. 2012, 31 pages.
Cluster File Systems, Inc., "Lustre: A Scalable, High-Performance File System," Nov. 2002, 13 pages.
Feiyi Wang et al., "Understanding Lustre Filesystem Internals," Tech Report: ORNL/TM-2009/117, Apr. 2010, 95 pages.

\* cited by examiner

*Primary Examiner* — Etienne Leroux
(74) *Attorney, Agent, or Firm* — Ryan, Mason & Lewis, LLP

(57) ABSTRACT

A storage system comprises a storage array, a network file system configured to communicate with the storage array, a server associated with the network file system, a client configured to communicate over a first path with the network file system via the server and to communicate directly with the storage array over a second path that bypasses the network file system, and a block cache arranged in the second path between the client and the storage array. The server may comprise a multi-path file system (MPFS) server and the client may comprise an MPFS client, with the MPFS server and the MPFS client being configured to communicate using a file mapping protocol. The block cache is illustratively implemented using a VFCache or other type of server flash cache.

20 Claims, 3 Drawing Sheets

US 8,862,645 B1

MULTI-PATH FILE SYSTEM WITH BLOCK CACHE BETWEEN CLIENT AND STORAGE ARRAY

FIELD

The field relates generally to data storage, and more particularly to techniques for accelerating performance of input-output operations in storage systems.

BACKGROUND

A number of techniques are known for accelerating input-output performance of storage systems. For example, multi-path file system (MPFS) is a product developed by EMC Corporation of Hopkinton, Mass. This product can accelerate performance of a network file system, including by way of example, conventional network file systems known in the art as NFS and CIFS, one or more of which may involve use of network attached storage (NAS).

In a typical conventional arrangement, an MPFS client obtains control data, including disk volumes, block identifiers and other file layout information, from an MPFS server implemented in or otherwise associated with a network file system, and performs input-output (IO) operations such as read operations and write operations directly with a back-end storage array. Accordingly, the MPFS client need not access all of its data through the MPFS server and its associated network file system. Instead, file data is exchanged directly between the client and the storage array, and only associated control data passes through the server.

By providing separate transport mechanisms for file data and control data, MPFS decreases overall network traffic, and increases the speed at which the client can access file data in the storage array. For example, MPFS can allow thousands of clients to access shared file data with higher performance than conventional file sharing protocols such as NFS and CIFS. MPFS may therefore be viewed as combining the file sharing advantages of a network file system with high performance and efficient data delivery of a storage area network (SAN). MPFS is particularly well suited for use in applications such as high performance computing, grid computing, distributed computing, virtualization, and file system backup.

Despite the considerable advantages associated with MPFS, a need remains for additional improvements. For example, further acceleration of IO operations, leading to enhanced storage system performance relative to conventional practice, would be desirable.

SUMMARY

Illustrative embodiments of the present invention provide storage systems that implement block caching functionality between MPFS clients and a storage array, in a manner that provides substantial improvement in IO performance relative to conventional arrangements. For example, use of a block cache arranged between a given MPFS client and a storage array overcomes disadvantages that could otherwise arise when performing caching in a Linux kernel or other operating system kernel of an associated host computer.

In one embodiment, a storage system comprises a storage array, a network file system configured to communicate with the storage array, a server associated with the network file system, a client configured to communicate over a first path with the network file system via the server and to communicate directly with the storage array over a second path that bypasses the network file system, and a block cache arranged in the second path between the client and the storage array.

The server may comprise an MPFS server and the client may comprise an MPFS client, with the MPFS server and the MPFS client being configured to communicate using a file mapping protocol.

The block cache is illustratively implemented using a VFCache or other type of server flash cache.

An MPFS client performs a given read operation by first attempting to read a data block from its associated block cache and only reading the data block from the storage array if the data block is not available in the block cache.

The MPFS client performs a given write operation by writing a data block to the storage array and caching the data block in its associated block cache.

If another MPFS client also associated with the MPFS server undertakes a write operation that involves a data block previously cached in a block cache of the first MPFS client, the first MPFS client receives a corresponding notification via the server and invalidates the data block in the block cache.

One or more of the illustrative embodiments described herein exhibit enhanced performance relative to conventional arrangements. For example, these arrangements can provide further acceleration of IO operations between a client and a storage array, thereby optimizing storage system performance.

DETAILED DESCRIPTION

Illustrative embodiments of the present invention will be described herein with reference to exemplary storage systems and associated computers, servers, storage devices and other processing devices. It is to be appreciated, however, that the invention is not restricted to use with the particular illustrative system and device configurations shown. Accordingly, the term "storage system" as used herein is intended to be broadly construed, so as to encompass, for example, physical or virtual data centers, private or public cloud systems distributed over multiple geographically-dispersed locations, as well as other types of storage systems comprising one or more sites.

Figure 1:
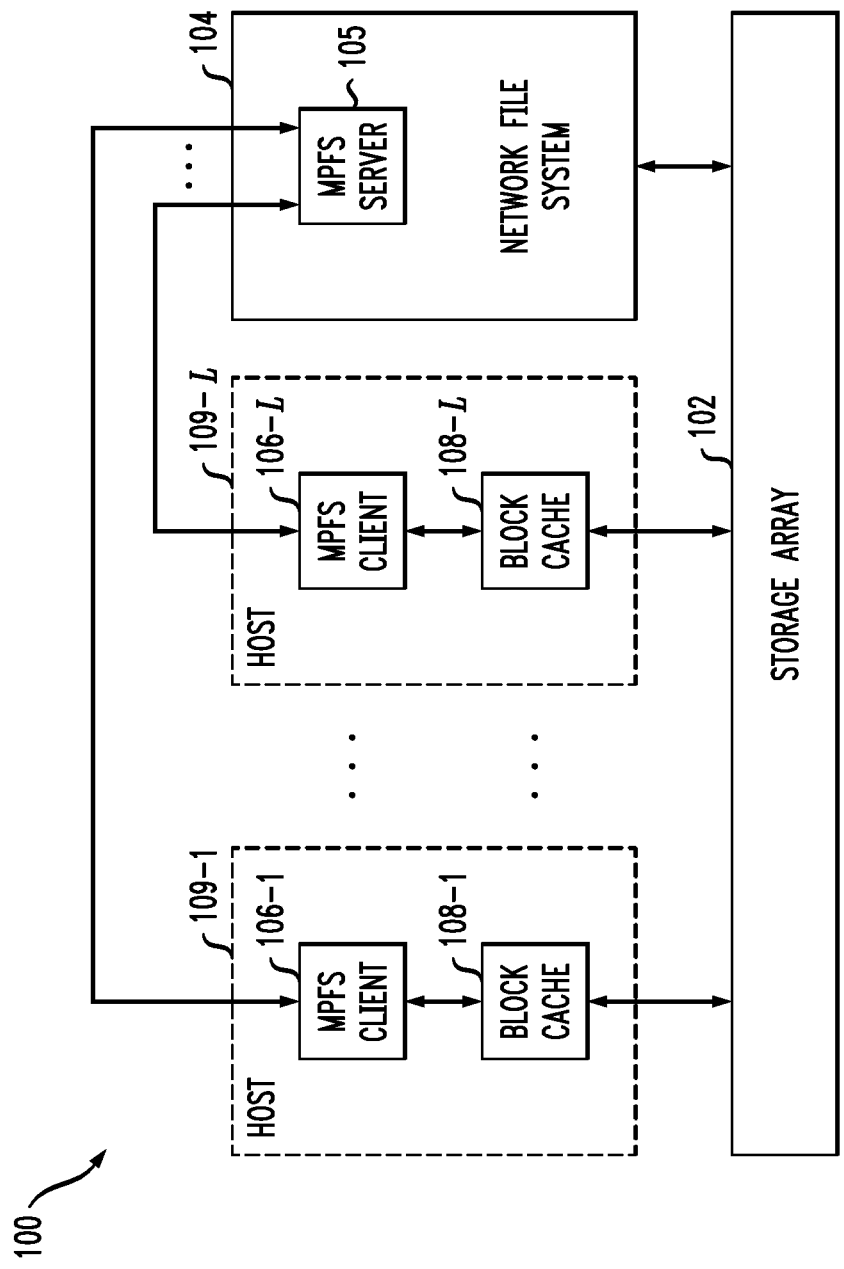
FIG. 1 is a block diagram of a storage system with block caches implemented between respective clients and a storage array in an illustrative embodiment of the invention.

FIG. 1 shows a storage system 100 configured in accordance with an illustrative embodiment of the present invention. The storage system 100 comprises a storage array 102 and a network file system 104 configured to communicate with the storage array 102. The term "network file system" is intended to encompass, by way of example, network file systems known as NFS and CIFS, where CIFS denotes Common Internet File System, as well as other types of network file systems. The term is therefore used in a general sense herein and should not be construed as being limited to any particular type of network file system. A given such network file system may but need not involve use of one or more NAS protocols.

The storage system 100 further comprises a server 105 associated with the network file system 104, and a plurality of clients 106-1 through 106-L configured to communicate over respective first paths with the network file system 104 via the server 105 and to communicate directly with the storage array 102 over respective second paths that bypass the network file system 104.

Also, a plurality of block caches 108-1 through 108-L are arranged in the respective second paths between the respective clients 106-1 through 106-L and the storage array 102. The block caches 108 in the present embodiment are assumed to be implemented using a server flash cache, and more particularly a VFCache commercially available from EMC Corporation of Hopkinton, Mass. The VFCache provides enhanced functionality for performing high-speed block read and write operations to an associated storage array while also providing data integrity protection. Additional details regarding VFCache can be found in EMC Corporation, "Introduction to EMC VFCache," White Paper, No. H10502.1, February 2012, pp. 1-31, which is incorporated by reference herein. Other types of server flash cache may be used in other embodiments. It is also possible to utilize block caches that are based on fast memory types other than flash memory.

A given client 106 and its associated block cache 108 are both implemented on a computer or other host device 109. By way of example, the block cache 108 may be in the form of a Peripheral Component Interconnect Express (PCIe) card or other type of circuit card installed in a computer in which the client 106 is running. However, it is possible in other embodiments to implement client and block cache elements on separate devices.

In the present embodiment, the server 105 more particularly comprises a multi-path file system (MPFS) server and the clients 106 more particularly comprise respective MPFS clients, with the MPFS server 105 and the MPFS clients 106 being configured to communicate using a file mapping protocol (FMP). However, in other embodiments, other types of servers and clients may be used.

Additional details regarding conventional aspects of MPFS server and client elements can be found in, for example, EMC Corporation, "Using VNX Multi-Path File System," No. 300-013-460, Rev. 01, EMC VNX Series, Release 7.1, July 2012, pp. 1-64, and EMC Corporation, "EMC Celerra Multi-Path File System (MPFS)," Data Sheet, November 2009, pp. 1-4, which are incorporated by reference herein.

Figure 4:
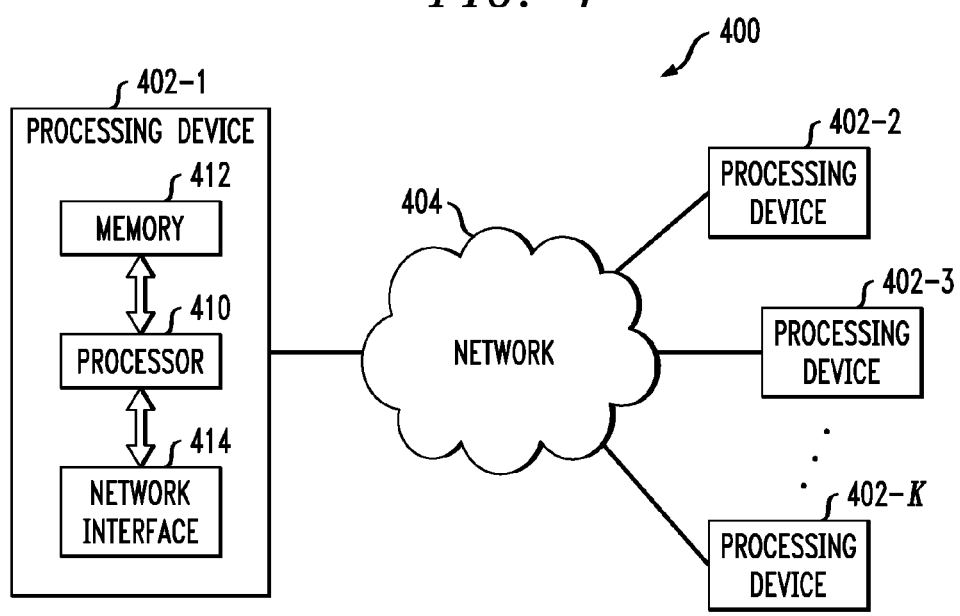

System elements such as server 105 and clients 106 may be implemented on respective host computers or other processing devices having processor, memory and network interface components. For example, a given such processing device may implement both the server 105 and other parts of the network file system 104, or one of the clients 106 and its associated block cache 108. An example of a processing platform comprising a networked arrangement of multiple such processing devices will be described below in conjunction with FIG. 4. A given processing device memory as disclosed herein may be viewed as an example of what is more generally referred to as "computer program products" storing executable computer program code.

It should also be appreciated that server 105, clients 106 and block caches 108 may each be implemented at least in part in the form of software that is stored in a memory of a processing device and executed by a processor of that processing device. Also, a given such processing device memory may be viewed as comprising storage elements of a corresponding one of the block caches 108.

As noted above, a given one of the MPFS clients 106 communicates over a first path with the network file system 104 via MPFS server 105, and communicates directly with the storage array 102 over a second path that passes through the corresponding block cache 108 but bypasses the network file system 104.

Thus, the given MPFS client 106 can perform file operations directed to the network file system 104 over the first path via the MPFS server 105. Such file operations may comprise, for example, obtaining file layout information from the network file system 104 over the first path via the MPFS server 105. Other examples of information obtained via file operations over the first path include file names, directory structures, and access permissions.

Also, the given MPFS client 106 can perform IO operations with the storage array 102 over the second path such that the IO operations are subject to block caching in the corresponding block cache 108.

The IO operations will generally include both read and write operations. A read operation performed by a given MPFS client 106 involves first attempting to read a data block from the corresponding block cache 108 and only reading the data block from the storage array 102 if the data block is not available in the block cache. A write operation performed by the given MPFS client 106 involves writing a data block to the storage array 102 and caching the data block in the corresponding block cache 108.

The MPFS server 105 provides notifications to the given MPFS client 106 when one or more other MPFS clients have written to data blocks that are cached in the block cache 108 of the given MPFS client. The given MPFS client 106 is configured to respond to such a notification by invalidating the appropriate data block or data blocks in its corresponding block cache 108.

In addition, the MPFS clients 106 may be configured to invalidate contents of their respective block caches 108 under designated failure conditions. Each block cache 108 may also be configured to automatically retrieve valid data from the storage array 102 upon restart of its corresponding client after a given failure condition. This will help to reduce client recovery latency.

Figure 2:
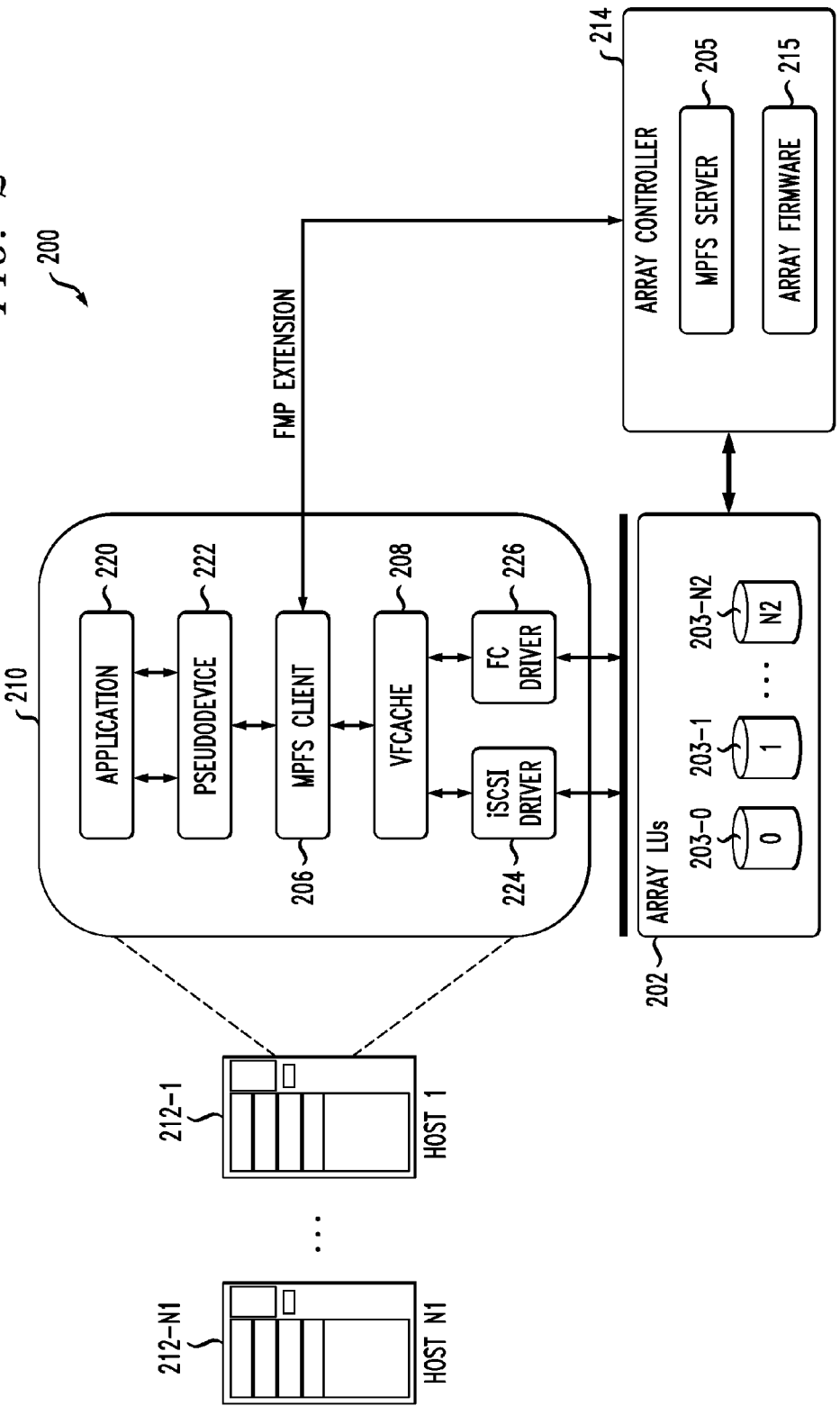
FIG. 2 is a block diagram of another exemplary storage system with a block cache implemented between a client and a storage array in another embodiment.

Another illustrative embodiment of the invention is shown in FIG. 2. In this embodiment, a storage system 200 comprises a storage array 202 that includes multiple logical units or LUs 203, an MPFS server 205 and an MPFS client 206. The logical units 203 may comprise portions of one or more storage arrays.

By way of example, such storage arrays may comprise storage products such as VNX and Symmetrix VMAX, both commercially available from EMC Corporation of Hopkinton, Mass. A variety of other storage products may be utilized to implement at least a portion of the logical units 203.

A module 210 associated with a given one of a plurality of host computers 212-1 through 212-N1 comprises the MPFS client 206 and a VFCache 208 arranged in a first path between the MPFS client 206 and the storage array 202. The storage array 202 as shown comprises N2+1 logical units denoted 203-0 through 203-N2.

The MPFS client 206 communicates via a second path with the MPFS server 205 which is implemented in an array controller 214 comprising array firmware 215. The second path in this embodiment uses an FMP extension as indicated in the figure. The array controller 214 may be viewed as a component of a network file system such as network file system 104 of the FIG. 1 embodiment.

The module 210 further comprises an application 220 associated with a pseudodevice 222 that is coupled to the MPFS client 206. Also included in the module 210 are multiple block IO drivers, including an Internet Small Computer System Interface (iSCSI) driver 224 and a Fibre Channel (FC)

driver 226, both coupled between the VFCache 208 and the storage array 202. In other embodiments, only one of the drivers 224 and 226 may be included, or other types of drivers may be used. Although the module 210 is shown only for host computer 212-1 in the figure, it is assumed that each of the other host computers 212 is similarly configured to comprise a module such as module 210 that includes an MPFS client, a VFCache, one or more block IO drivers and possibly other elements. Modules such as module 210 may be implemented at least in part in the form of one or more circuit cards that are installed in the corresponding host computer 212.

The host computers 212 are examples of what are more generally referred to herein as "host devices." It should be noted that embodiments of the invention are not limited to use with host devices having any particular operating system. For example, embodiments of the invention can be implemented using host devices with Linux operating systems, Windows operating systems, or other types of operating systems, in any combination.

The embodiment illustrated in FIG. 2 provides significant improvements in the operation of the storage system 200 by incorporation of a VFCache 208 operating in conjunction with an MPFS client 206 in each of the host computers 212. As a result, each MPFS client 206 is provided with accelerated IO performance in a manner that significantly improves the overall performance of the storage system relative to conventional arrangements. Copies of recently-accessed data will reside in the flash-based VFCache 208 and can be used to satisfy read requests from the corresponding MPFS client 206 immediately without having to access the slower back-end storage array 202. Such a block caching arrangement also overcomes disadvantages that could otherwise arise if one were to attempt to perform caching in an operating system kernel of the associated host computer 212.

Significant improvements are also obtained in terms of failure recovery. For example, an MPFS client can invalidate its associated VFCache under designated failure conditions, thereby preventing stale data from being read. Moreover, the VFCache can automatically repush data upon restart of the MPFS client, thereby reducing latency on failure recovery.

In other embodiments, the VFCache 208 may be incorporated into only a subset of the host computers 212. However, it is expected that maximum benefit relative to conventional practice is achieved when all MPFS clients 206 are configured with a corresponding VFCache 208 as illustrated in module 210.

Figure 3:
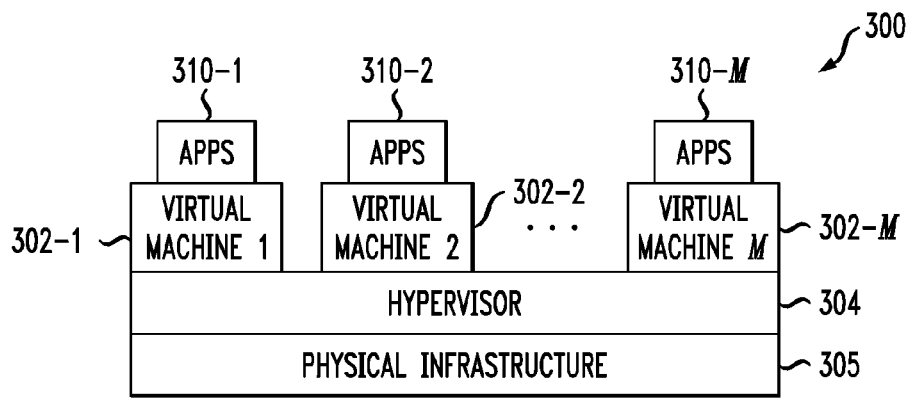
FIGS. 3 and 4 show examples of processing platforms that may be utilized to implement at least a portion of the systems of FIGS. 1 and 2.

Referring now to FIG. 3, portions of the storage system 100 or 200 may comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure of multi-site storage system 100 in one or more embodiments of the invention is the VMware® vSphere™ which may have an associated virtual infrastructure management system such as the VMware® vCenter™.

As indicated previously, the system 100 or 200 may be implemented using one or more processing platforms. One or more of the processing modules or other components of system 100 or 200 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 or 200 and includes a plurality of processing devices, denoted 402-1, 402-2, 402-3, . . . 402-K, which communicate with one another over a network 404.

The network 404 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and storage system 100 or 200 may include additional or alternative processing platforms, as well as numerous distinct processing platforms in any combination, with each such platform comprising one or more computers, servers, storage devices or other processing devices.

As indicated above, storage system functionality such as that described in conjunction with FIGS. 1 and 2 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware. For example, a given one of the VFCaches 208 comprises software in combination with flash memory. Other types of block caches used in embodiments of the invention may be configured in a similar manner.

It should again be emphasized that the above-described embodiments of the invention are presented for purposes of illustration only. Many variations and other alternative embodiments may be used. For example, the disclosed techniques are applicable to a wide variety of other types of devices and network file systems that can benefit from acceleration of IO operations using block caching as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage array;
a network file system configured to communicate with the storage array;
a server associated with the network file system;
a client configured:
to perform file operations directed to the network file system by communicating over a first path with the network file system via the server; and
to perform input-output operations with the storage array via a block cache by communicating with the storage array over a second path that bypasses the network file system, the block cache being arranged in the second path between the client and the storage array.

2. The apparatus of claim 1 wherein the server comprises a multi-path file system (MPFS) server and the client comprises an MPFS client and the MPFS server and the MPFS client are configured to communicate using a file mapping protocol.

3. The apparatus of claim 1 wherein the network file system comprises one of NFS and CIFS.

4. The apparatus of claim 1 wherein the server is implemented within an array controller associated with the network file system.

5. The apparatus of claim 1 wherein the block cache comprises a server flash cache.

6. The apparatus of claim 1 wherein the block cache comprises a VFCache.

7. The apparatus of claim 1 further comprising at least one of an iSCSI driver and a Fibre Channel driver coupled between the block cache and the storage array.

8. The apparatus of claim 1 wherein the client and block cache are implemented on a host device.

9. The apparatus of claim 1 further comprising:
a plurality of clients configured to perform file operations directed to the network file system by communicating over respective first paths with the network file system via the server and to perform input-output operations with the storage array via a plurality of block caches by communicating with the storage array over respective second paths that bypass the network file system, the plurality of block caches arranged in the respective second paths between the respective clients and the storage array.

10. A processing platform that incorporates the apparatus of claim 1.

11. The processing platform of claim 10 comprising a plurality of processing devices with each such processing device comprising a processor coupled to a memory.

12. A method, implemented in a client, comprising:
performing file operations directed to a network file system associated with a storage array by communicating over a first path with the network file system via a server;
performing input-output operations with the storage array via a block cache by communicating with the storage array over a second path that bypasses the network file system, the block cache being arranged in the second path between the client and the storage array.

13. The method of claim 12 wherein the file operations comprise obtaining file layout information from the network file system over the first path via the server.

14. The method of claim 12 wherein performing input-output operations comprises performing a given read operation by first attempting to read a data block from the block cache arranged in the second path and only reading the data block from the storage array if the data block is not available in the block cache.

15. The method of claim 12 wherein performing input-output operations comprises performing a given write operation by writing a data block to the storage array and caching the data block in the block cache arranged in the second path.

16. The method of claim 12 wherein the performing steps are implemented for a first client associated with the server and wherein if another client also associated with the server undertakes a write operation that involves a data block previously cached in the block cache of the first client, the first client receives a corresponding notification via the server and invalidates the data block in the block cache.

17. The method of claim 12 wherein the method is carried out by a processing platform comprising a plurality of processing devices, a given such processing device comprising a processor coupled to a memory.

18. A computer program product comprising a processor-readable storage medium having encoded therein executable code of one or more software programs, wherein the one or more software programs when executed cause a client to:
perform file operations directed to a network file system associated with a storage array by communicating over a first path with the network file system via a server; and
perform input-output operations with the storage array via a block cache by communicating with the storage array over a second path that bypasses the network file system, the block cache being arranged in the second path between the client and the storage array.

19. The computer program product of claim 18 wherein performing input-output operations comprises performing a given write operation by writing a data block to the storage array and caching the data block in the block cache arranged in the second path.

20. The computer program product of claim 18 wherein the performing steps are implemented for a first client associated with the server and wherein if another client also associated with the server undertakes a write operation that involves a data block previously cached in the block cache of the first client, the first client receives a corresponding notification via the server and invalidates the data block in the block cache.

* * * * *